United States Patent [19]
Baker

[11] Patent Number: 5,267,648
[45] Date of Patent: Dec. 7, 1993

[54] DEVICE FOR THE TRANSPORTING AND STACKING OF CYLINDRICAL OBJECTS, SUCH AS GAS CYLINDERS, PIPES, ETC.

[75] Inventor: Bryan Baker, Houston, Tex.

[73] Assignee: Drilltec Patents & Technologies Company, Inc., Houston, Tex.

[21] Appl. No.: 907,718

[22] Filed: Jul. 2, 1992

[30] Foreign Application Priority Data

Nov. 27, 1991 [DE] Fed. Rep. of Germany ....... 4138882

[51] Int. Cl.⁵ ............................................. B65D 85/20
[52] U.S. Cl. .................................................. 206/446
[58] Field of Search ......................................... 206/446

[56] References Cited

U.S. PATENT DOCUMENTS 4,901,870 2/1990 Wright et al. ................. 206/446 X

FOREIGN PATENT DOCUMENTS 1544664 2/1990 U.S.S.R. ............................... 206/446

Primary Examiner—Price William I.
Attorney, Agent, or Firm—Allegretti & Witcoff, Ltd.

[57] ABSTRACT

A device for the transporting and stacking of cylindrical objects, such as pipes, gas cylinders, etc., comprises a flat bottomed clamping frame 4, 6 which is provided with opposed complementary yokes 16, 18. The yokes have arcuate support surfaces or saddles for the cylindrical objects. The clamping frames 4, 6 are connected with one another by means of tubular stringers. The lower yoke 16 and upper yoke 18 are drawn together by connecting rods 22, 24, 76 to clamp the cylindrical objects in the device.

10 Claims, 3 Drawing Sheets

DEVICE FOR THE TRANSPORTING AND STACKING OF CYLINDRICAL OBJECTS, SUCH AS GAS CYLINDERS, PIPES, ETC.

BACKGROUND OF THE INVENTION

The invention relates to a device for the transporting and stacking of cylindrical objects, such as pipes, gas cylinders, etc., especially of cylindrical objects of large dimensions and, accordingly, of greater weight.

Large gas cylinders and large pipes are frequently stacked on top of one another in a triangular shape, in several layers, whereby the lowest, widest layer is fastened laterally by means of wedge-shaped blocks. This type of storage is not very secure; if one of the blocks slips away, the entire stack can begin to roll in a way which is dangerous for humans and objects. The transporting, relocating or loading of individual cylinders or pipes, such as with the help of a forklift truck, for example, is always in danger of rolling away, or of rolling against the super-structure of the forklift. Particular care is required in the case of large and heavy gas cylinders, which can weigh several tons.

THE INVENTION

The object of the present invention is to provide a device for the transporting and stacking of cylindrical objects, by means of which, in particular, cylindrical objects of larger dimensions and correspondingly greater weight can be transported and stacked in a secure manner.

In accordance with the invention, each cylindrical object is mounted in a rectangular, flat bottomed, frame, which ensures a secure position, even when in a stack. During transport, the cylindrical objects which are clamped within the frame can no longer roll away. The transport is preferably carried out by inserting the fork of the forklift between the lower side of the cylindrical object and the frame parts located below the cylindrical objects.

The device in accordance with the invention is relatively simple, but can, nevertheless, be produced in such a way as to be very stable, and is characterized by means of simple handling.

THE DRAWINGS

Advantageous and suitable further developments of the invention are described in the following specification and the accompanying drawings, in which FIG. 1 is a perspective representation of a first embodiment of a device for the transporting and stacking of cylindrical objects in accordance with the invention.

The same elements in the figures of the drawings are provided with the same reference numbers.

DETAILED DESCRIPTION

Figure 1:
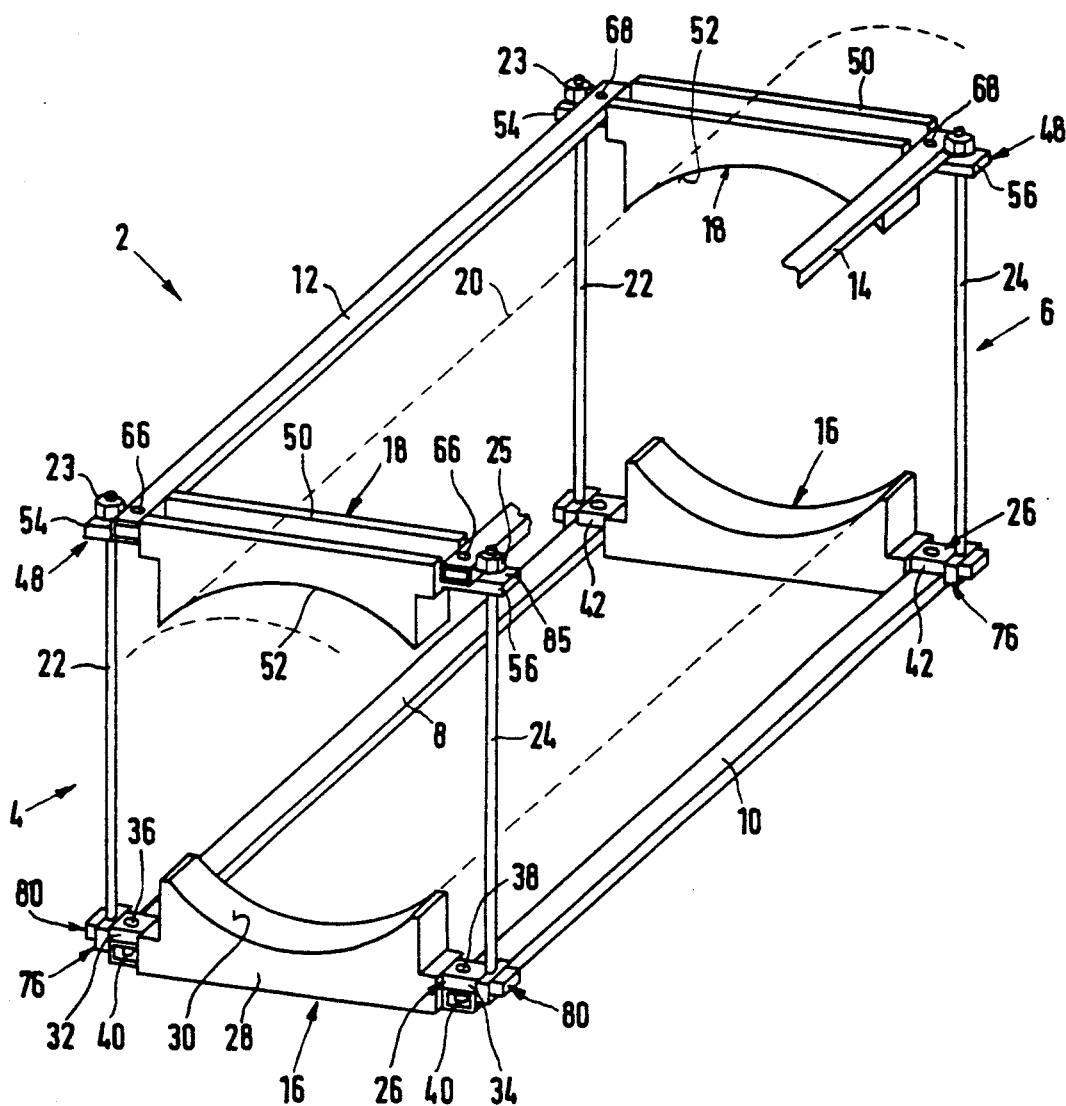

FIG. 1 depicts a device 2 for the accommodation and the clamping of cylindrical objects. The device 2 has two spaced clamping frames 4, 6 which are connected by means of tubular stringers 8, 10, 12, 14.

Each clamping frame 4, 6 comprises a lower yoke 16 and an upper yoke 18, between which a cylindrical object 20, such as, for example, a gas cylinder, a pipe, or the like, is clamped by means of threaded rods or elongated screw bolts 22, 24 and nuts 23, 25. By tightening the nuts, the lower yoke and the upper yoke can be drawn toward one another, and thereby against the lower side and the upper side of the cylindrical object 20.

The lower yoke 16 comprises a cross member 26 extending from both sides of the yoke and a flat bottomed support base 28, including arcuate saddle 30 which complements the curvature of the cylindrical objects 20. The upper yoke 18 is of the same construction, but is inverted. The saddles 30, 52 on yokes 16, 18 face each other. The cross member 26, 48 is, preferably, extrusion-molded with the support base 28, 50 and the saddles 30, 52 on the contact surfaces thereof.

Figure 2:
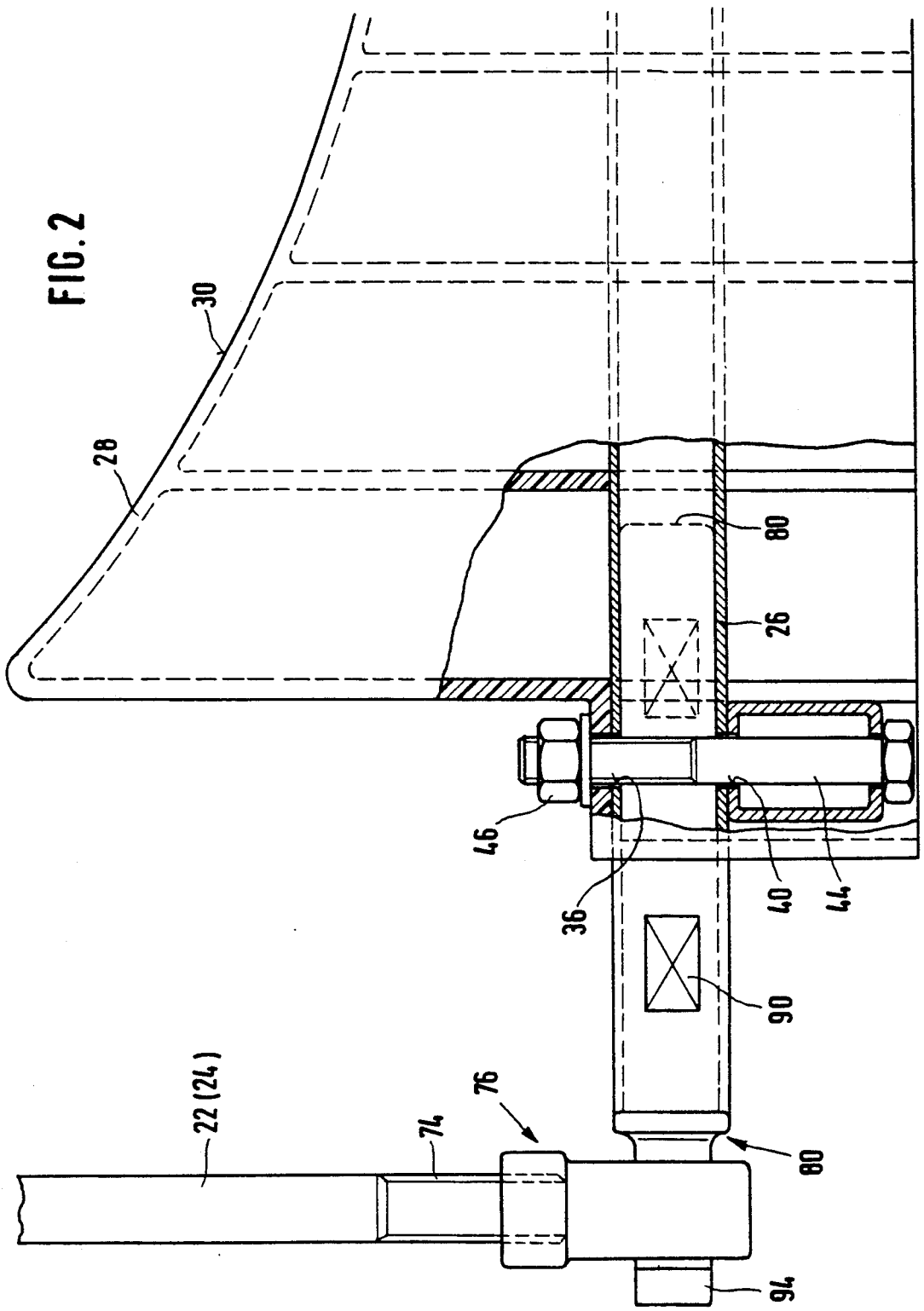
FIG. 2 is a detail of the lower left hand corner of the device shown in FIG. 1, partially cut away.

The cross member 26 projects, on both sides of the yoke 16 and includes projections 32, 34, which contain vertical holes or bores 36, 38. The length of the projections 32, 34 corresponds at least to the width of the tubular stringers 8, 10, which also have at their ends, holes 40, 42 with which the holes 36, 38 of the projections can be aligned. The projections 32, 34 of the lower yokes of two clamping frames 4, 6 are connected to the stringers 8, 10 by means of threaded bolts 44 and nuts 46 inserted through the holes as best shown in FIG. 2.

The upper yoke 18 comprises a rectangular tubular cross member 48, like cross member 26. Yoke 18 has a flat bottomed support base 50 of plastic and a saddle 52. The cross member 48 is preferably integrally extrusion-molded with the support base 50.

The cross member 48 projects on both sides from the yoke 18 and terminates in projections 54, 56. Two longitudinally-spaced holes (not depicted) are provided in each end of the cross member 48 to receive bolt 44 and connecting rod 22, respectively.

To connect the two upper yokes 18 of clamping frames 4 and 6, projections 54, 56 on the respective frames are bolted to stringers 12, 14. The stringers have holes 66, 68 which can be aligned with holes in the projections 54, 56 to receive bolts 44 which are secured with nuts 46 (FIG. 2).

Figure 4:
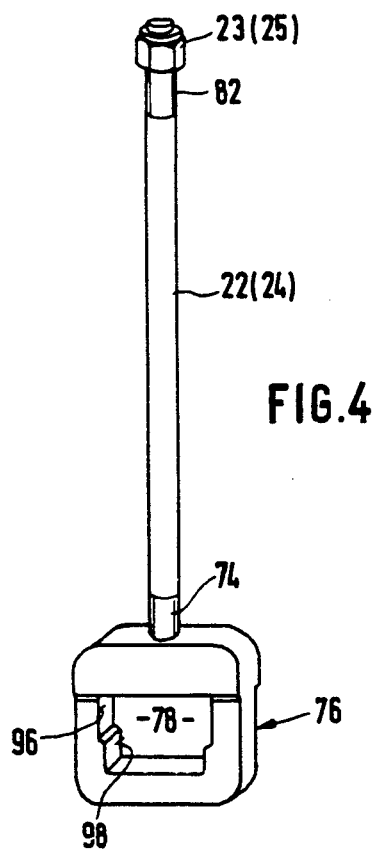
FIG. 4 is a connecting rod comprising part of the clamping means used in the devices of FIGS. 1 to 3.

The connecting rods 22, 24 serve to connect the lower yokes 16 to the upper yokes 18. The lower end of the rods 22, 24, are provided with threads 74 which screw into a tapped hole in ring-shaped clamp 76 as shown in FIG. 4. The rod with the ring-shaped clamp can be connected through its aperture 78 to a mounting bracket 80, extending from cross member 26. The upper end of the rods 22, 24 is inserted through the externally-positioned holes in the tubular cross member 48. The nuts 23 and 25 are screwed onto threads 82 (FIG. 4) on the ends of the rods. The holes through the ends of cross member 48 can also be constructed in the form of oblong slots at 85 which are open laterally to receive rods 22, 24 from the side.

Figure 3:
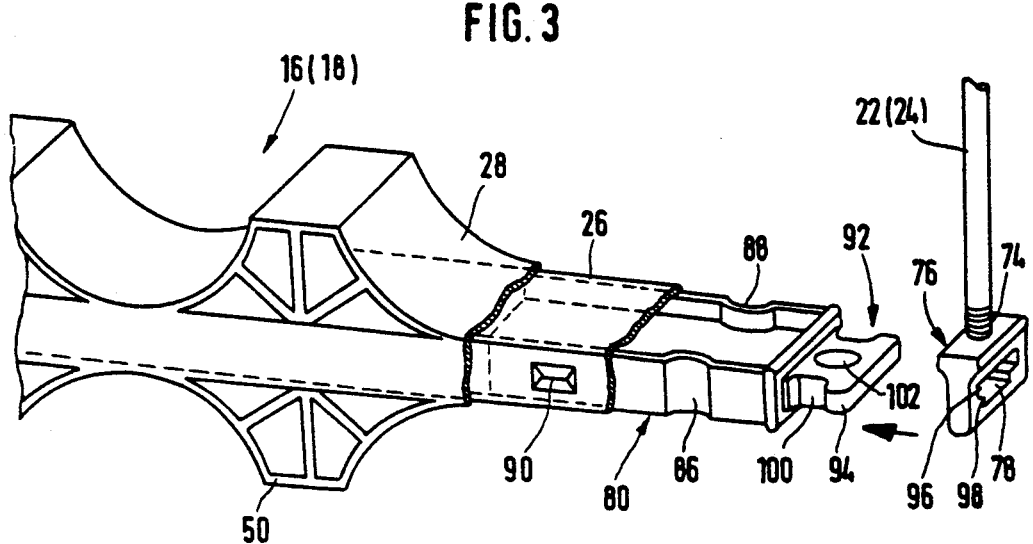
FIG. 3 is a perspective representation of a part of a second embodiment of a device for the transporting and stacking of cylindrical objects.

As shown in FIG. 3, the mounting bracket 80 consists of a solid forged part, the external dimensions of which approximately correspond to the internal dimensions of the tubular cross member 26. For fixing the mounting bracket in correct position, depressions 86, 88 are provided in the side walls thereof which engage the projections 90 formed in the side walls of the cross member 26 to engage in a locking manner when the bracket is inserted in the tubular cross member. These projections can be formed by means of inwardly-pressed wall segments as shown in FIG. 3. The bracket 80 is removable by reason of this construction.

A tongue 92 projects from the free end of the mounting 80 and has an approximately T-shaped profile in plan view.

The aperture 78 in the ring-shaped clamp 76 is likewise constructed with an approximately T-shaped opening. The dimensions of the tongue 92 and of the T-aperture 78 are so selected that the T-beam or wider top portion 94 can be inserted through the T-beam or wider top portion 96 of the aperture 78. The width of the T-handle or narrower lower portion of the tongue 92 corresponds to the width of the narrower lower portion 98 of the T-shaped opening 78, so that, during the tightening of the connecting rods 22, 24 by means of the nuts 23, 25, the narrow portion 100 of the T-shaped tongue 92 is moved into the lower narrow portion 98 of opening 78, and the wider top portion 94 of the tongue 92 passes beyond the ring clamp 76 on the outside as shown in FIG. 2. By this means, the danger of the ring clamp 76 sliding off the mounting bracket 80 is securely prevented. Connecting rods with the ring-shaped clamps can be secured with a single nut, requiring just one person for attaching the clamps.

FIG. 3 shows an embodiment of the invention in which the upper part of the clamping frame and the lower part of the clamping frame are constructed in an identical manner, especially with respect to the lower yoke 16 of the embodiment shown in FIGS. 1 and 2. Inside the tongue 92, an opening 102 is provided through which the lower threaded end of the connecting rods 22, 24 passes. Furthermore, the support base 28 can be equipped, on both its upper and lower sides, with saddles or support surfaces, as is shown in FIG. 3.

Figure 5:
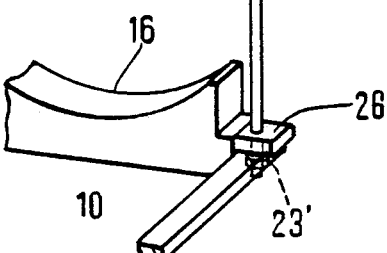
FIG. 5 is a perspective view broken out of the upper right hand corner of FIG. 1 showing a simplified embodiment of the invention for connecting the yokes.

As shown in FIG. 5, the connection of the cross members 26, 48 to the stringers 8, 10, 12, 14 can be carried out in a simpler manner than described above by inserting the connecting rods 22, 24 through aligned openings in the stringers and the cross members in the upper and lower yokes, thereby connecting simultaneously the upper and lower yokes and the spaced clamping frames 4, 6. The tightening, against the cylindrical object, of the lower and upper yokes of the clamping frames 4, 6 is effected by nuts 23' which can be screwed onto the threaded ends of the threaded connecting rods 22, 24. Through this simpler embodiment, the bolts 44 for connecting the cross members with the stringers, the mounting bracket 80 and the ring-shaped clamps 76 can be dispensed with.

What I Claim is:

1. A device for transporting and stacking cylindrical objects comprising
a pair of spaced, flat bottomed, clamping frames,
stringers extending between said frames to connect them together,
each of said clamping frames comprising
a lower yoke and an upper yoke,
a curved saddle on each yoke opposite said flat bottom, which saddles embrace said cylindrical objects, said saddles facing each other,
a cross member extending laterally from both sides of each yoke,
projections on the ends of said cross member,
said projections have openings therethrough,
said stringers have openings near the ends thereof,
said projection openings are aligned with said stringer openings, and
bolts extend through said aligned openings to secure said stringers to said clamping frames.
connecting rods connecting to said projections, thereby connecting said lower yokes to said upper yokes,
means on said connecting rods to pull said yokes together to clamp said clamping frames securely against said cylindrical objects.

2. The device of claim 1 in which
said projections on said lower yoke include mounting brackets
each said mounting bracket terminating in a tongue of generally T shape having a cross beam and a shank,
each said connecting rod having a ring-shaped clamp at one end thereof for securing said rod to said tongue,
said ring-shaped clamp having an opening therethrough to receive said tongue,
said opening also being of generally T shape, with a wide top portion and a narrow lower portion,
the cross beam of said T-shaped tongue being dimensioned to pass through the wide portion of said opening in said ring-shaped clamp, but not through the lower narrow portion,
the shank of said tongue being dimensioned to fit into said narrow lower portion of said ring-shaped clamp to lock the clamp to said lower yoke through said tongue and cross member, and
said connecting means including a fastener on the ends opposite said ring-shaped clamp of each said rod.

3. The device of claim 2 wherein said fastener comprises an opening through each cross member extending from said upper yoke, threads on the upper ends of each connecting rod opposite said ring-shaped clamp, said threaded ends extending through said opening, and a nut on said threaded ends.

4. The device of claim 3 in which said opening through each cross member is a slot to permit the rod to be inserted laterally.

5. The device of claim 3 in which said tongue has a transverse opening throughout, said ring-shaped clamp has a threaded opening therethrough, the lower ends of said connecting rods are threaded to permit screwing them into the threaded openings through said clamps and through the opening in said tongue to prevent lateral movement of said connecting rods relative to said cross members on said lower yokes.

6. A device for transporting and stacking cylindrical objects comprising
a pair of spaced, flat bottomed, clamping frames,
stringers extending between said frames to connect them together,
each of said clamping frames comprising
a lower yoke and an upper yoke and,
a curved saddle on each yoke opposite said flat bottom, which saddles embrace said cylindrical objects, said saddles facing each other,
a cross member extending laterally from both sides of each yoke, the ends of said cross members being connected to said stringers by threaded fasteners,
connecting rods connecting said lower yokes to said upper yokes, means on said connecting rods to pull said yokes together to clamp said clamping frames securely against said cylindrical objects.

7. The device of claim 2 in which said cross members are tubes of rectangular cross section and have projections extending inwardly from the side walls thereof, and said mounting brackets are slidably received within said cross members and have a rectangular cross section with depressions in the side walls thereof, which depressions receive said projections to lock said brackets in said cross members.

8. The device of claim 2 in which said tongues are integral with said mounting brackets.

9. A device for transporting and stacking cylindrical objects comprising
   a pair of spaced, flat bottomed, clamping frames,
   stringers extending between said frames to connect them together,
   each of said clamping frames comprising
      a lower yoke and an upper yoke, and
      a curved saddle on each yoke opposite said flat bottom, which saddles embrace said cylindrical objects, said saddles facing each other,
   a cross member extending laterally from both sides of said upper and lower yokes,
   a mounting bracket projection from both ends of said cross members,
      each mounting bracket having an opening therethrough,
      each stringer having an opening aligned with said mounting bracket opening,
   connecting rods connecting said lower yokes to said upper yokes,
   said connecting rods having threaded ends extending through said openings in the mounting brackets, and stringers
   cooperating threaded members screwed onto said threaded ends of said connecting rods to pull said yokes together to clamp said clamping frames securely against said cylindrical objects.

10. The device of claim 6 in which said yokes are molded from plastic material and said cross members are integrally molded therewith.

* * * * *